US011353906B2

(12) United States Patent
Daubner et al.

(10) Patent No.: US 11,353,906 B2
(45) Date of Patent: Jun. 7, 2022

(54) FUNCTIONAL ENHANCEMENT MODULE FOR AIRCRAFT

(71) Applicant: Lufthansa Technik AG, Hamburg (DE)

(72) Inventors: Viktor Daubner, Hamburg (DE); Frank Niss, Hamburg (DE); Pawel Piotrowski, Berlin (DE)

(73) Assignee: LUFTHANSA TECHNIK AG, Hamburg (DE)

( * ) Notice: Subject to any disclaimer, the term of this patent is extended or adjusted under 35 U.S.C. 154(b) by 0 days.

(21) Appl. No.: 17/254,878

(22) PCT Filed: Jun. 27, 2019

(86) PCT No.: PCT/EP2019/067155
§ 371 (c)(1),
(2) Date: Dec. 22, 2020

(87) PCT Pub. No.: WO2020/002503
PCT Pub. Date: Jan. 2, 2020

(65) Prior Publication Data
US 2021/0263546 A1    Aug. 26, 2021

(30) Foreign Application Priority Data
Jun. 27, 2018    (DE) ..................... 10 2018 115 473.9

(51) Int. Cl.
*G05F 1/625*    (2006.01)
*B64D 41/00*    (2006.01)
(Continued)

(52) U.S. Cl.
CPC ............. *G05F 1/625* (2013.01); *B64D 41/00* (2013.01); *B64D 47/08* (2013.01); *H02J 4/00* (2013.01);
(Continued)

(58) Field of Classification Search
CPC .. H02J 2310/44; H02J 3/14; H02J 4/00; H02J 1/14; H02J 2310/52; H02J 2310/60; B64D 2221/00; B64D 11/0624; B64D 41/00
See application file for complete search history.

(56) References Cited

U.S. PATENT DOCUMENTS 7,307,520 B2    12/2007 Lamon et al.
9,160,414 B2    10/2015 Lekatsas et al.
(Continued)

FOREIGN PATENT DOCUMENTS

DE    19906076 A1    8/2000
DE    10213261 A1    11/2002
(Continued)

*Primary Examiner* — Ryan Johnson
(74) *Attorney, Agent, or Firm* — Leydig, Voit & Mayer Ltd.

(57) ABSTRACT

A functional enhancement module is for vehicles and for enhancing a functional module which is supplied with electric power via a power supply bus. The functional enhancement module is configured to be supplied with the electric power via the power supply bus. The functional enhancement module includes: a controller having a power specification for a maximum power flow of the functional module and being configured to detect a current power flow at a reference point; and a power controller configured to control a power take-up of the functional enhancement module. The controller is configured to control the power controller in accordance with the detected power flow, such that a combined power take-up of the functional module and the functional enhancement module does not exceed the power specification.

12 Claims, 2 Drawing Sheets

(51) Int. Cl.
　　　*B64D 47/08*　　　(2006.01)
　　　*H02J 4/00*　　　(2006.01)
(52) U.S. Cl.
　　　CPC ....... *B64D 2221/00* (2013.01); *H02J 2310/44* (2020.01)

(56) References Cited

U.S. PATENT DOCUMENTS

2011/0079682 A1* 4/2011 Raybell .............. B64D 11/0624
　　　　　　　　　　　　　　　　　　　244/122 R
2016/0329724 A1　11/2016 Ibrahim

FOREIGN PATENT DOCUMENTS

| DE | 102012200487 | A1 |   | 7/2013 |   |   |
|---|---|---|---|---|---|---|
| DE | 102014204926 | A1 |   | 10/2015 |   |   |
| DE | 10066417 | B3 |   | 8/2016 |   |   |
| EP | 1028512 | A2 | * | 8/2000 | ................ | H02J 4/00 |
| EP | 1560311 | A1 | * | 8/2005 | ................ | H02J 1/14 |

* cited by examiner

FUNCTIONAL ENHANCEMENT MODULE FOR AIRCRAFT

CROSS-REFERENCE TO PRIOR APPLICATIONS

This application is a U.S. National Phase Application under 35 U.S.C. § 371 of International Application No. PCT/EP2019/067155, filed on Jun. 27, 2019, and claims benefit to German Patent Application No. DE 10 2018 115 473.9, filed on Jun. 27, 2018. The International Application was published in German on Jan. 2, 2020 as WO 2020/002503 under PCT Article 21(2).

FIELD

The present invention relates to a functional enhancement module for vehicles, particularly for commercial aircraft, and to an aircraft having a corresponding functional enhancement module.

BACKGROUND

In commercial aircraft, but also in other vehicles, various functional modules are provided in the form of self-contained modules, which are configured for the execution of one or more predefined functions and which, in many cases, are only connected to the electricity system of the commercial aircraft by means of a power connection plug and, optionally, a further data connection plug. Corresponding modules are frequently "line-replaceable units" (LRUs), which can be fitted and removed with a limited number of handling maneuvers.

One example of such functional modules are "passenger supply modules", which are arranged in the immediate vicinity of a passenger seat and which can assume various functions, according to requirements. In commercial aircraft, passenger supply modules are installed above each row of seats. They contain, inter alia, reading lights, and can also incorporate switchable instruction signs, such as the seat belt sign. In many cases, they also incorporate one or more loudspeakers for in-flight announcements by the pilot or cabin crew. Oxygen masks, which fall out of an opening in the event of a drop in cabin pressure, can also be an element of passenger supply modules.

Passenger supply modules are supplied with electric power by means of a power supply bus. In general, the power supply bus and the passenger supply modules are mutually tailored, such that the power supply bus can transmit sufficient electric power for the supply of all the passenger supply modules in the event of maximum power take-up, e.g. where all the reading lights are switched on. In aircraft in particular, the power supply bus is rated for this eventuality of maximum power take-up, with no provision for reserve power transmission capacity.

If, in the region of the passenger supply modules of an aircraft, additional electrical loads are to be retrofitted, this is generally only possible by means of complex alterations to the existing system. It is either necessary to reinforce the power supply bus, in order to permit the transmission of the additional electric power which is required for the additional electrical loads, or for the individual passenger modules to undergo a complex overhaul, or to be entirely replaced, such that the maximum power take-up of the passenger module which is expanded by the inclusion of an additional load is no higher than the maximum power take-up of the unaltered or existing module (wherein, for example, reading lights having incandescent or halogen lamps are replaced by more economical LED reading lights). In all cases, the retrofitting of additional electrical loads in the region of the passenger supply modules is complex and cost-intensive.

The same applies correspondingly to other functional modules, and to the power supply bus thereof.

SUMMARY

In an embodiment, the present invention provides a functional enhancement module that is for vehicles and for enhancing a functional module which is supplied with electric power via a power supply bus. The functional enhancement module is configured to be supplied with the electric power via the power supply bus. The functional enhancement module includes: a controller having a power specification for a maximum power flow of the functional module and being configured to detect a current power flow at a reference point; and a power controller configured to control a power take-up of the functional enhancement module. The controller is configured to control the power controller in accordance with the detected power flow, such that a combined power take-up of the functional module and the functional enhancement module does not exceed the power specification.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

DETAILED DESCRIPTION

Figure 1:
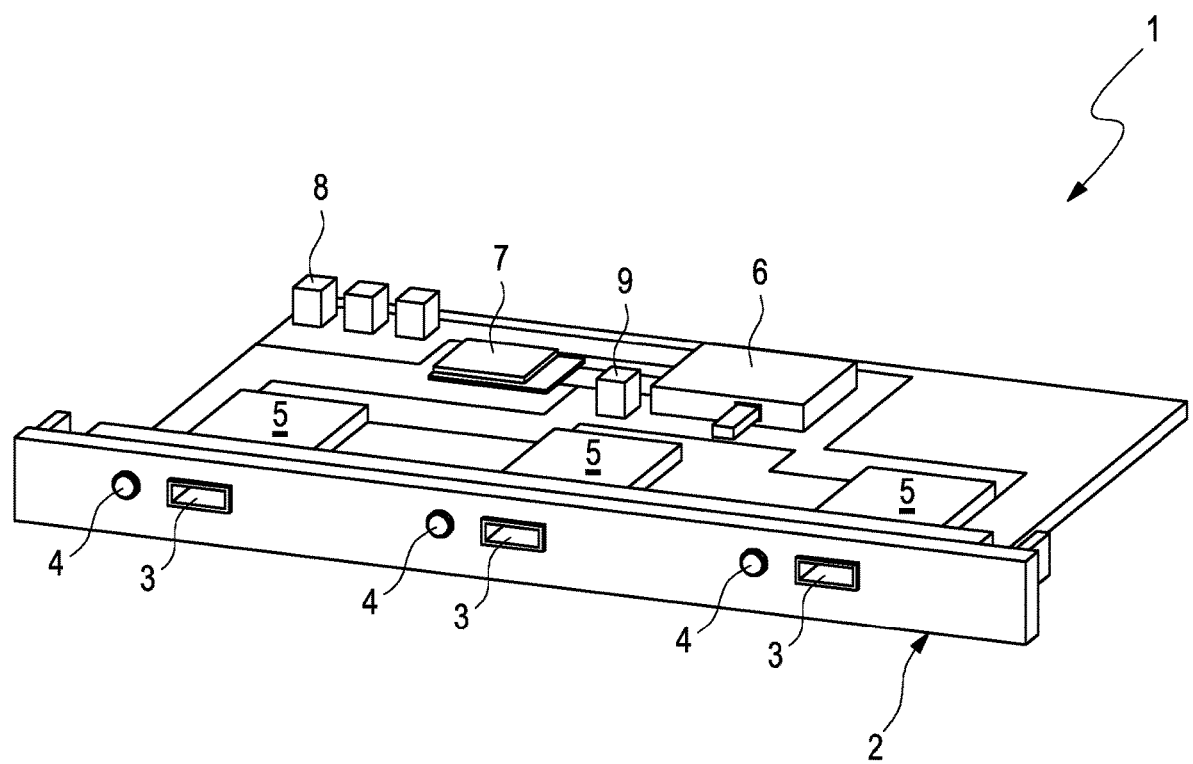
FIG. 1 shows a first exemplary embodiment of a functional enhancement module according to the invention.

Embodiments of the present invention enable the provision of an option for the incorporation of additional electrical loads in the region of functional modules, such that the disadvantages of the prior art no longer occur, or only occur to a limited extent.

An embodiment of the present invention provides a functional enhancement module for vehicles, for enhancing a functional module which is supplied with electric power via a power supply bus, wherein the functional enhancement module is designed to be supplied with electric power via the power supply bus, and comprises:

a control device having a power specification for the maximum power flow of the functional module and a detection module for detecting the current power flow at a reference point, and a power controller for controlling the power take-up of the functional enhancement module, wherein the control device is designed to control the power controller in accordance with the detected power flow, such that the combined power take-up of the functional module and the functional enhancement module does not exceed the power specification.

An embodiment of the present invention provides an aircraft, particularly a commercial aircraft, having at least one functional module, at least one functional enhancement module according to the invention which is assigned to a functional module, and a power supply bus for supplying power to the at least one functional module and the at least one functional enhancement module.

An insight of the present inventors is that additional electrical loads do not require any complex alteration of an existing power supply bus and/or of functional modules, if the additional electrical loads are controlled such that, by the power take-up thereof, existing limiting values are not exceeded. On the basis of this finding, the invention provides a functional enhancement module, by means of which an existing functional module can be expanded to incorporate an additional function, in the form of an electrical load, without the necessity for the alteration of the functional module or of the power supply bus.

To this end, in the control device of a functional enhancement module, only a power specification for the maximum electric power flow in the functional module which is assigned to the functional enhancement module is saved. A detection module is further provided for detecting the actual power flow at a reference point. The control device is then designed to control the power take-up of the functional enhancement module by means of a power controller, such that the combined (i.e. total) power take-up of the functional module and the functional enhancement module does not exceed the power specification. In other words, a power take-up by the functional enhancement module is only executed in a context in which the functional module which is assigned thereto does not require this power. Accordingly, the functional enhancement module only exploits any existing power reserves of its assigned functional module; if no reserve power is available (for example on the grounds that, exceptionally, all the reading lights of a functional module which is configured in the form of a passenger supply module are switched on), the power controller is set to zero.

It is possible for the reference point to be selected such that the current power detected at the reference point is the actual instantaneous power of the functional module. The control device can then be designed to set the power take-up of the functional enhancement module to a value which is smaller than or equal to the difference between the power specification and the current power detected at the reference point. It is thus ensured that the combined power take-up of the functional module and the functional enhancement module does not exceed the power specification.

Alternatively, it is possible for the reference point to be selected such that the current power detected at the reference point is the sum of the actual instantaneous powers of the functional module and the functional enhancement module. The control device is then designed to set the power take-up of the functional enhancement module to a value such that the current power detected at the reference point is smaller than or equal to the power specification. It can thus also be ensured that the combined power take-up of the functional module and the functional enhancement module does not exceed the power specification.

Although, according to the first-mentioned alternative, it is possible, in principle, for the functional enhancement module to be connected to the power supply bus in parallel with the functional module, in preferred embodiments, even in this alternative, the functional enhancement module may be configured in the form of a power shunt, which can be arranged between the power supply bus and the functional module, and is configured for the transfer of electric power from the power supply bus to the functional module. In a corresponding configuration, the functional enhancement module can simply be interposed between the power supply bus and the functional module, without the necessity for any alterations to the power supply bus and the functional module. In the configuration as a power shunt, the control device, the power controller and the detection module can also be combined in a single physical unit, as the reference point can be arranged in the region of the power shunt. The fitting of a single physical unit of this type is simple in its conception:

release of the connection of the functional module to the power supply bus;

connection of the functional enhancement module to the power supply bus (for example, to the previous connection point of the functional module); and connection of the functional module to the functional enhancement module.

The functional module can be a passenger supply module, whereby the functional enhancement module is thus a passenger supply enhancement module.

In a preferred embodiment, the functional enhancement module has at least one socket of an electrical plug-in connection, preferably a standardized socket, and further preferably a USB socket, for the connection of external loads. In this case, the load which is to be supplied with electric power does not constitute a direct part of the functional enhancement module, but is an external device such as, e.g. a portable terminal device of a passenger. Using the functional enhancement module, the passenger can operate their portable terminal device and/or can charge the energy store thereof.

In a preferred embodiment, the functional enhancement module has at least two, and more preferably at least three sockets. Particularly if the functional module which is to be enhanced is a passenger supply module, which generally supplies more than one seat or passenger, it is advantageous if the functional enhancement module is also configured for the supply of more than one seat or passenger.

In a preferred embodiment, the control device and/or power controller is designed for the individual control of power outputs via the individual sockets. If, for example, sufficient reserve power is not available for the supply of the or of all the socket(s) in service for the charging of portable terminal devices to a sufficient current strength, it is advantageous if only a proportion of sockets are supplied with a sufficient current strength for the charging of portable terminal devices, and the remaining proportion of sockets are temporarily deactivated, until such time as sufficient power is also available for these sockets. If sufficient power is available, the current strength on the currently employed sockets can also be increased in excess of the minimum magnitude required for the charging of portable terminal devices, until the reserve power is exhausted.

Control lights can be provided, by means of which the respective status of the socket(s), namely, whether a portable terminal device which is connected thereto is supplied with electric power, is indicated. If the control lights indicate that a portable terminal device which is connected to a socket is not supplied with electric power, a passenger can increase the reserve power by switching off a load on the functional module, for example the reading light, such that sufficient power is available for the supply of the above-mentioned portable terminal device.

Alternatively or additionally, the functional enhancement module can incorporate a sensor and/or a camera. Data recorded by the at least one sensor and/or the at least one camera are preferably buffered in a storage module which is directly provided in the functional enhancement module, such that no permanent data link between the functional enhancement module and a receiver of the collected data is required. In this case, the control device of the functional enhancement module is preferably designed only to initiate the transmission of buffered data to a predefined receiver in the event of the availability of sufficient electric power, to which end the functional enhancement module incorporates an appropriate communication module. It can thus be ensured that communication by the functional enhancement module, which is generally energy-intensive, is only executed at times during which the electric power required for this purpose is actually available. At other times, however, the available power is optionally sufficient for the detection of sensor and/or camera data, and for the saving thereof in the storage module.

The functional enhancement module can also be configured for the execution of other arbitrary functions.

In a preferred embodiment, the detection module is designed for the detection of at least two of the current power flows with respect to the power take-up of the functional module, the power take-up of the functional enhancement module and/or the combined power take-up of the functional module and the functional enhancement module. The control device can then be designed for the plausibility checking of detected values and/or for the execution of control on the basis of power flows detected. By plausibility checking, using a further detected power flow, the detection of the power flow or power flows which are directly employed for the control of the power controller, and/or the correct operation of the power controller, can be monitored. In the event of the detection of a malfunction of the detection module and/or of the power controller, the power controller of the functional enhancement module can be permanently set to zero.

For the explanation of the aircraft according to the invention, reference should be made to the above-mentioned descriptions.

Figure 2:
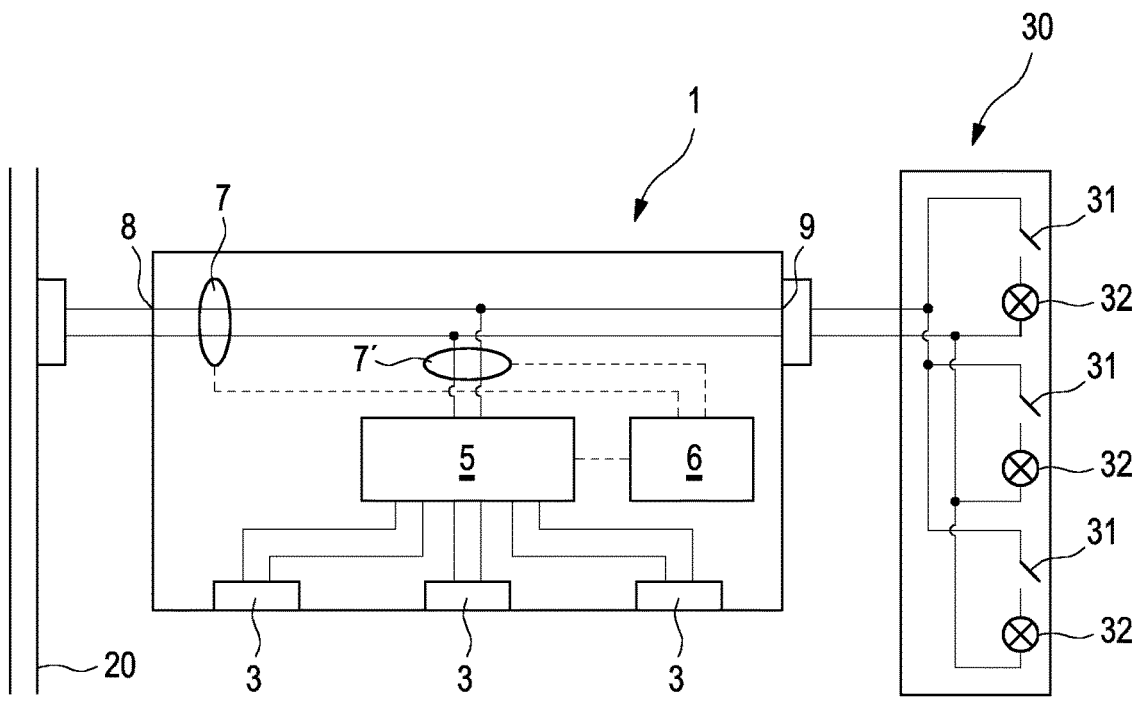
FIG. 2 shows a schematic representation of a first variant of the functional enhancement module of FIG. 1.
Figure 3:
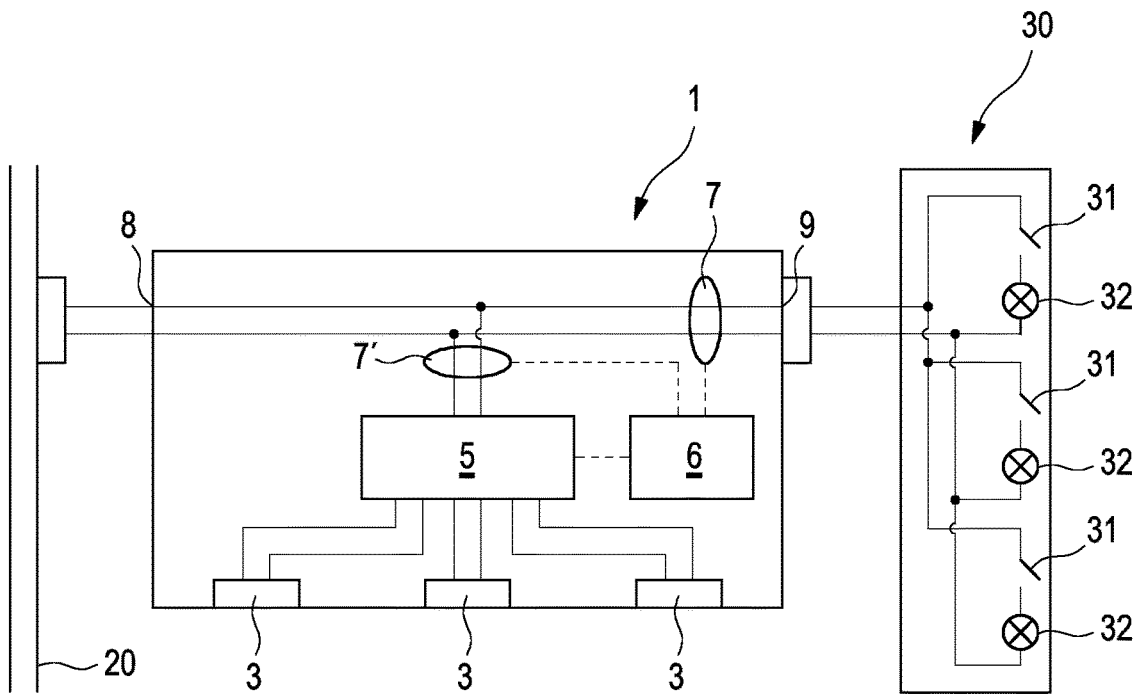
FIG. 3 shows a schematic representation of a second variant of the functional enhancement module of FIG. 1.

FIG. 1 represents a first exemplary embodiment of a functional enhancement module 1 according to the invention. The functional enhancement module 1 is a passenger supply enhancement module, and is designed to be installed, next to a passenger supply module, in the form of a functional module 30 incorporating reading lights 32 which are switchable by means of switches 31 (c.f. FIGS. 2 and 3), above the passenger seats of a commercial aircraft. The functional enhancement module 1 is electrically interposed between a power supply bus 20 and a functional module 30 (c.f. FIGS. 2 and 3).

On the panel 2 which, with the functional enhancement module 1 in the installed position, is accessible from the exterior, three USB sockets 3 are provided for the connection of portable terminal devices of a passenger, in order to charge said devices. A control light 4 is provided next to each of the USB sockets 3, which can optionally be illuminated with a red or green display, and by means of which it is indicated whether a portable terminal device which is connected to a USB socket 3 is actually being charged (green) or whether, at present, insufficient power is available for the charging of the portable terminal device (red).

The functional enhancement module 1 incorporates a power controller 5 which is distributed over the supply conductors of the individual USB sockets 3, by means of which the power flow to or via the USB sockets 3 can be set individually. The distributed power controller 5 is controlled by means of a control device 6, with reference to a current power flow which is detected by a detection module 7, such that the combined power take-up of the functional module 30 and the functional enhancement module 1 does not exceed a power specification for the maximum permissible power flow in the functional module 30 which is saved in the control device 6, and which can ultimately be determined by the quality of the power supply bus 20 and the number of modules which are supplied by the latter. In the exemplary embodiment represented, the detection module 7 detects the current at the reference point, from which, in combination with the target voltage of the power supply bus 20, the current power flow is determined.

The mode of operation of the functional enhancement module 1 will now be described in greater detail with reference to FIGS. 2 and 3, each of which represents a variant of embodiment. In FIGS. 2 and 3, the distributed power controller 5 according to FIG. 1 is represented as a single unit. In the interests of clarity, representation of the control lights 4 and the connection thereof to the control unit 6 has been omitted.

The functional enhancement module 1 is configured in the form of a power shunt, which is arranged between the power supply bus 20 and the functional module 30, and is designed for the transfer of electric power from the power supply bus 20 to the functional module 30. To this end, the input 8 of the functional enhancement module 1 is connected to the power supply bus 20 wherein, to this end, that connection point on the power supply bus 20 can additionally be employed, at which the functional module 1 was previously directly connected to the power supply bus. At its output 9, the functional enhancement module 1 is connected to the functional module 30. The input 8 and the output 9 are configured such that customary plug connectors for the connection of the power supply bus 20 to the functional module 30 are still usable, as a result of which no modification to the power supply bus 20 and/or to the functional module 30 is required in this regard. Moreover, the functional enhancement module 1 is transparent, i.e. no modifications are required either to the power supply bus 20 or to the functional module 30, in order to permit the interposition of the functional enhancement module 1, as described.

In the variant of embodiment according to FIG. 2, the combined power flow to the functional module 30 and the functional enhancement module 1 is detected by the detection module 7. The control unit 6 is designed, by the appropriate actuation of the power controller 5, to set the power take-up of the functional enhancement module 1 to a value such that the current power detected is lower than or equal to the power specification which is saved in the control device 6. Power output via the individual USB sockets 3 can thus be adjusted individually and, in particular, can also be interrupted such that, in the event of insufficient reserve power, for example, only one of the three USB sockets 3 is operated. If additional power is made available by the switch-off of a reading light 32, previously deactivated USB sockets can optionally be restored to service.

In the variant of embodiment according to FIG. 3, the power flow to the functional module 30, but not to the power controller 5 of the passenger enhancement module 1 is detected by the detection module 7. In this variant of embodiment, the control device 6 is designed, by the appropriate actuation of the power controller 5, to set the power take-up of the functional enhancement module 1 to a value such that the power take-up of the functional enhancement module 1 is smaller than or equal to the difference between the power specification and the current power detected. Accordingly, in this variant, it is also ensured that the combined power take-up of the functional module 30 and the functional enhancement module 1 does not exceed the power specification.

In both variants of embodiment according to FIGS. 2 and 3, the detection module 7, at the location 7', additionally detects the power flow to the power controller 5, by means of which the correct operation of the power controller 5 can be monitored. If the power flow is detected at all the points indicated in FIGS. 2 and 3, a plausibility check of the detected values can be executed, wherein the combined power flow detected (c.f. the detection module 7 from FIG. 2) is compared with the sum of the individual detected power flows to the functional module 30 (c.f. the detection module 7 from FIG. 3) and the functional enhancement module 1 (c.f. the detection point 7' from FIGS. 2 and 3). In the event of a deviation which exceeds a predefined measuring tolerance, which may be indicative of a malfunction in the detection module 7, the power controller 5 is controlled by the control device 6 such that no further electric power flows to the USB sockets 3.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A functional enhancement module for vehicles, the functional enhancement module being configured to be assigned to a functional module which is supplied with electric power via a power supply bus, the functional enhancement module being configured to be supplied with the electric power via the power supply bus, and the functional enhancement module comprising:
    a controller having a power specification for a maximum power flow of the functional module and being configured to detect a current power flow at a reference point; and
    a power controller configured to control a power take-up of the functional enhancement module,
    wherein the controller is configured to control the power controller in accordance with the detected power flow, such that a combined power take-up of the functional module and the functional enhancement module does not exceed the power specification.

2. The functional module as claimed in claim 1, wherein the reference point is selected such that the current power detected at the reference point is an actual instantaneous power of the functional module, wherein the control device is configured to set the power take-up of the functional enhancement module to a value which is smaller than or equal to a difference between the power specification and the current power detected at the reference point.

3. The functional enhancement module as claimed in claim 1, wherein the reference point is selected such that the current power detected at the reference point is a sum of the actual instantaneous powers of the functional module and the functional enhancement module, and wherein the controller is configured to set the power take-up of the functional enhancement module to a value such that the current power detected at the reference point is smaller than or equal to the power specification.

4. The functional enhancement module as claimed in claim 1, wherein the functional enhancement module is configured in a form of a power shunt, which is configured to be arranged between the power supply bus and the functional module, and is configured for the transfer of the electric power from the power supply bus to the functional module.

5. The functional enhancement module as claimed in claim 1, wherein the functional enhancement module comprises at least one socket of an electrical plug-in connection for the connection of external loads.

6. The functional enhancement module as claimed in claim 5, wherein the functional enhancement module comprises at least two sockets.

7. The functional enhancement module as claimed in claim 5, wherein the controller or the power controller is configured for an individual control of power outputs via the socket(s).

8. The functional enhancement module as claimed in claim 1, wherein the functional enhancement module comprises a sensor or a camera.

9. The functional enhancement module as claimed in claim 1, wherein the controller is configured to detect at least two of the current power flows with respect to the power take-up of the functional module, the power take-up of the functional enhancement module or the combined power take-up of the functional module and the functional enhancement module, and
wherein the controller is configured to perform a plausibility checking of detected values or for the execution of control on the basis of power flows detected.

10. The functional enhancement module as claimed in claim 1, wherein the functional enhancement module is a passenger supply enhancement module for a passenger supply module which is configured in the form of a functional module.

11. An aircraft, the aircraft comprising:
    at least one functional module;
    at least one functional enhancement module which is assigned to a functional module; and
    a power supply bus for the supply of power to the at least one functional module and the at least one functional enhancement module, wherein the at least one functional enhancement module comprises the functional enhancement module configured as claimed in claim 1.

12. The functional enhancement module as claimed in claim 8, wherein recorded data from the sensor or the camera are buffered in a storage module of the functional enhancement module, wherein the control device is configured to initiate the transmission of the buffered data to a predefined receiver only in an event of the availability of sufficient electric power.

* * * * *